(12) United States Patent
Wang et al.

(10) Patent No.: US 8,532,200 B1
(45) Date of Patent: Sep. 10, 2013

(54) SYSTEM AND METHOD FOR SIDE BAND COMMUNICATION IN SERDES TRANSMISSION/RECEIVE CHANNELS

(75) Inventors: Gang Wang, Shanghai (CN); Wei Zhou, San Jose, CA (US); Chee Hoe Chu, San Jose, CA (US); Po-Chien Chang, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 354 days.

(21) Appl. No.: 12/868,414

(22) Filed: Aug. 25, 2010

Related U.S. Application Data (60) Provisional application No. 61/237,781, filed on Aug. 28, 2009.

(51) Int. Cl.
*H04L 7/033* (2006.01)

(52) U.S. Cl.
USPC ............ 375/259; 375/254; 375/253; 375/355

(58) Field of Classification Search
USPC ......................................................... 375/259
See application file for complete search history.

(56) References Cited

U.S. PATENT DOCUMENTS

| | | | |
|---|---|---|---|
| 7,363,563 B1 * | 4/2008 | Hissen et al. ................. | 714/733 |
| 7,894,491 B2 * | 2/2011 | Batty et al. .................... | 370/537 |
| 7,940,667 B1 * | 5/2011 | Coady et al. ................... | 370/238 |
| 8,063,686 B1 * | 11/2011 | Naviasky et al. ............. | 327/231 |
| 2003/0134607 A1 * | 7/2003 | Raghavan et al. ............ | 455/132 |
| 2003/0217301 A1 * | 11/2003 | Levy et al. .................... | 713/400 |
| 2007/0050596 A1 * | 3/2007 | Cooke ............................ | 711/216 |
| 2010/0183053 A1 * | 7/2010 | Tran et al. ..................... | 375/219 |
| 2010/0219996 A1 * | 9/2010 | Abel et al. ..................... | 341/120 |
| 2010/0321573 A1 * | 12/2010 | Bohm ............................ | 348/554 |
| 2010/0322340 A1 * | 12/2010 | Bohm ............................ | 375/295 |
| 2011/0006807 A1 * | 1/2011 | Schneiderwind ............... | 326/39 |
| 2011/0038286 A1 * | 2/2011 | Ta et al. ......................... | 370/295 |
| 2011/0043253 A1 * | 2/2011 | O'Keeffe et al. .............. | 327/12 |
| 2011/0068836 A1 * | 3/2011 | Wang et al. .................... | 327/141 |
| 2011/0096661 A1 * | 4/2011 | Bradbury et al. ............. | 370/228 |
| 2011/0241728 A1 * | 10/2011 | Redgrave et al. .............. | 326/38 |
| 2011/0317793 A1 * | 12/2011 | Katz et al. ..................... | 375/371 |
| 2012/0008621 A1 * | 1/2012 | Khan et al. .................... | 370/352 |

OTHER PUBLICATIONS

IEEE Std 802.3-2005; (Revision of IEEE Std 802.3-2002 including all approved amendments); IEE Standard for Information technology—Telecommunications and information exchange between systems, Local and metropolitan area networks—Specific requirements, Part 3: Carrier sense multiple access with collision detection (CSMA/CD) access method and physical layer specifications; IEEE Computer Society; Sponsored by the LAN/MAN Standards Committee; Dec. 9, 2005; 2696 pages.

* cited by examiner

*Primary Examiner* — Chieh M Fan
*Assistant Examiner* — Santiago Garcia (57) ABSTRACT

A system includes a side band transmission module configured to combine side band data with a clock signal to generate a modified clock signal. The system also includes a serializer configured to provide a waveform corresponding to serialized input data. The modified clock signal adjusts at least one of a leading edge or a falling edge of N half cycles of the waveform based on the side band data to form a modified waveform. The serializer is configured to output the modified waveform. N is greater than or equal to 1.

13 Claims, 11 Drawing Sheets

SYSTEM AND METHOD FOR SIDE BAND COMMUNICATION IN SERDES TRANSMISSION/RECEIVE CHANNELS

CROSS-REFERENCE TO RELATED APPLICATIONS

This application claims the benefit of U.S. Provisional Application No. 61/237,781, filed on Aug. 28, 2009. The disclosure of the above application is incorporated herein by reference in its entirety.

FIELD

The present disclosure relates to serializer/deserializer (SERDES) devices. More particularly, the present disclosure relates to side band communications in SERDES TX/RX channels.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Serializer/deserializer (SERDES) devices are commonly used where systems communicate with each other over a communications channel using serial bitstreams. In particular, SERDES devices are used for systems that internally handle multi-bit data words over parallel busses. Each SERDES device typically includes a serializer that converts the data words to a serial bitstream before transmitting the bitstream over the channel. Each SERDES also typically includes a deserializer that converts a serial bitstream received from the channel to a plurality of data words.

Figure 1:
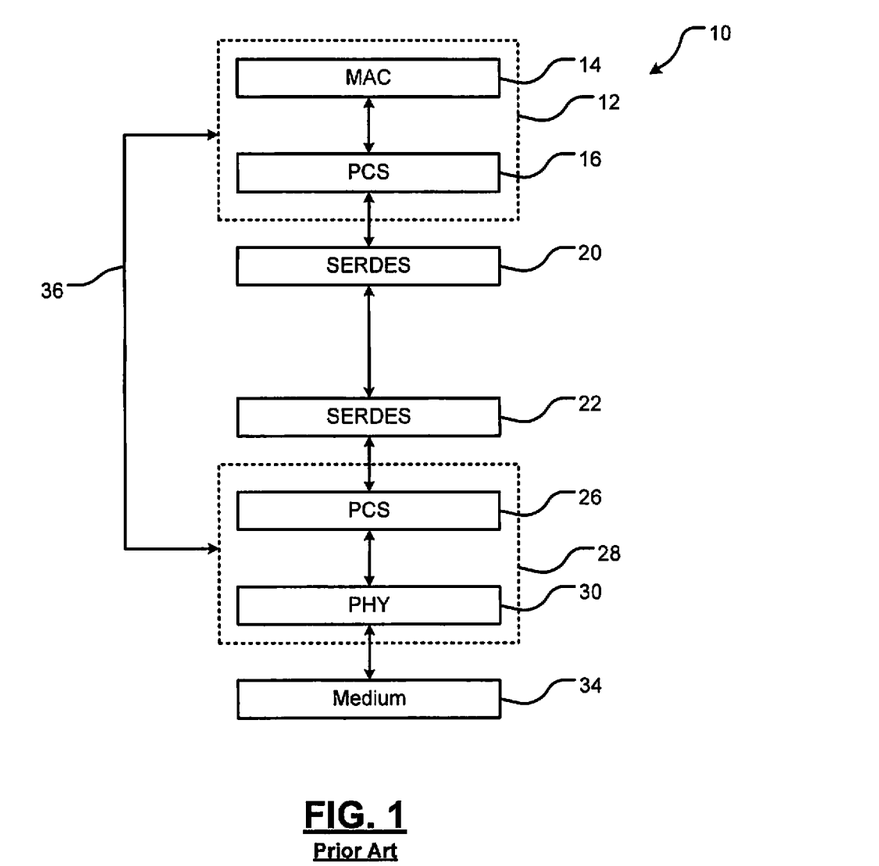
FIG. 1 is a functional block diagram of a network device including MAC and PHY devices connected by a SERDES according to the prior art.

FIG. 1 illustrates a conventional network device 10 including a medium access controller (MAC) module with a Gigabit MAC 14 and a physical coding sublayer (PCS) module 16. An output of the MAC module 12 is input to a first SERDES 20, which provides a serial link at a fixed data rate. A second SERDES 22 communicates with the first SERDES 20 and is connected to a PCS module 26 of a physical layer (PHY) module 28 that also includes a PHY 30. The MAC module 12 communicates with higher level layers. The PHY 30 communicates with a medium 34. In one example, the PCS module 16 performs 8/10 bit encoding as specified by IEEE 802.3, which is incorporated herein by reference. Alternative examples include use of another suitable PCS coding. A serial management interface 36 provides control information between the MAC module 12 and the PHY module 28.

SUMMARY

A system includes a side band transmission module configured to combine side band data with a clock signal to generate a modified clock signal. The system also includes a serializer configured to provide a waveform corresponding to serialized input data. The modified clock signal adjusts at least one of a leading edge or a falling edge of N half cycles of the waveform based on the side band data to form a modified waveform. The serializer is configured to output the modified waveform. N is greater than or equal to 1.

In other features, the system described above is implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 2:
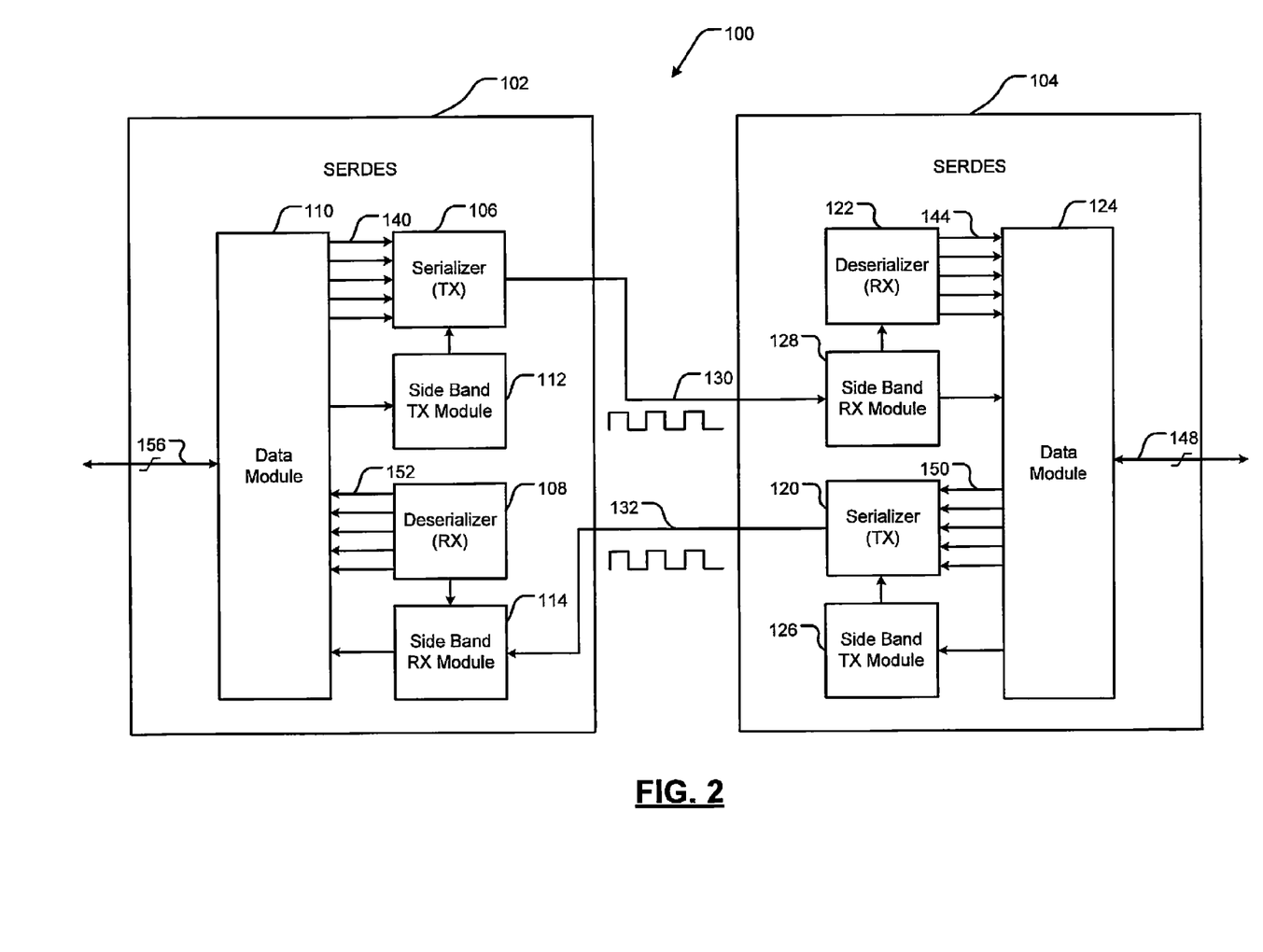
FIG. 2 is a functional block diagram of a system including two SERDES in communication according to the present disclosure.

FIG. 2 illustrates a block diagram of one embodiment of a data transmission system 100. The system 100 includes a first serializer/deserializer (SERDES) 102 in communication with a second SERDES 104. Numerous alternative systems including SERDES may also be implemented according to the present disclosure.

The SERDES 102 includes a serializer 106, a deserializer 108 and a data module 110. The SERDES 102 also includes a side band TX module 112 in communication with the serializer 106, and a side band RX module 114 in communication with the deserializer 108.

In one example, the SERDES 104 is located on a different chip than the SERDES 102. The SERDES 104 includes a serializer 120, a deserializer 122 and a data module 124. The SERDES 104 also includes a side band TX module 126 in communication with the serializer 120, and a side band RX module 128 in communication with the deserializer 122.

In this simplified example, the serializer 106 communicates with the deserializer 122 via a transmission channel 130. Likewise, the deserializer 108 communicates with the serializer 120 via a receive channel 132. The transmission channel 130 and the receive channel 132 may comprise a single serial communication channel. Numerous communication channels are included in alternative embodiments, and the SERDES 102, 104 can communicate using one or more physical connections. However, the SERDES 102 and the SERDES 104 are typically coupled together using a communication channel that uses fewer connections than the number of parallel connections 140 that are input to the serializer 106 or output from the deserializer 108.

The data module 110 generates a parallel data stream over parallel connections 140. In the example of FIG. 2, the number of parallel connections 140 is five, but any number of parallel connections may be implemented. Typically, the number of parallel connections 140 is many tens, or hundreds. The serializer 106 receives the parallel data over parallel connections 140 and serializes the data for transmission over the transmission channel 130. The serialized data is modulated based on side band data from the side band TX module 112.

Figure 3:
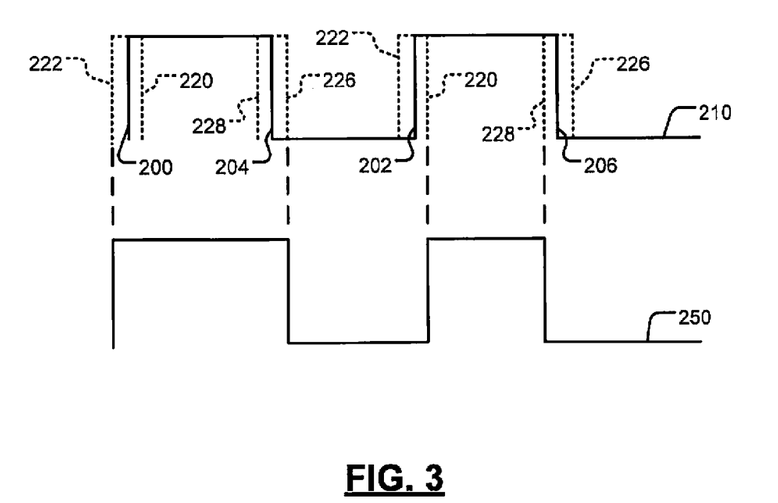
FIG. 3 is a graphical representation that illustrates adjustments to a waveform.

Referring to FIG. 3, the side band TX module 112 modulates data transmitted along the transmission channel 130. More particularly, the side band TX module 112 modulates at least one of leading edges 200, 202 and trailing edges 204, 206, or both of data transmitted along the transmission channel 130.

In FIG. 3, an example of an initial waveform 210 configured by the serializer 106 is illustrated prior to modulation by the side band TX module 112. The initial waveform 210 is illustrated with a solid line. The side band TX module 112 can modulate the leading edges 200, 202 either forward or backward in time from the position the leading edges 200, 202 are in for the initial waveform 210. In one embodiment, moving the leading edges 200, 202 forward is illustrated by modulation positions 220, and corresponds to a 1 in the side band data. Moving the leading edges 200, 202 backward is illustrated by modulation positions 222 and corresponds to a 0 in the side band data.

Three modulation positions are illustrated, including the original position of the leading edges 200, 202 of the initial waveform 210. However, more or less modulation positions may be used depending on the configurations of the side band TX module 112 and the side band RX module 128. Further, more or less modulation positions may be used depending on the type of data being input into the initial waveform 210 by the side band TX module 112.

The side band TX module 112 can also modulate the trailing edges 204, 206 either forward or backward in time from the position the trailing edges 204, 206 are in for the initial waveform 210. Moving the trailing edges 204, 206 forward is illustrated by modulation positions 226, and moving the trailing edges 204, 206 backward is illustrated by modulation positions 228.

Three modulation positions 226 are illustrated, including the original position of the trailing edges 204, 206 of the initial waveform 210. However, more or less modulation positions may be used depending on the configurations of the side band TX module 112 and the side band RX module 128. Further, more or less modulation positions may be used depending on the type of data being input into the initial waveform 210 by the side band TX module 112.

A post-modulation waveform 250 is illustrated to show an example of the initial waveform 210 following modulation by the side band TX module 112. Numerous other post-modulation waveforms may be generated based on the particular data that the side band TX module 112 is modulating into the initial waveform 210.

In FIG. 2, the side band RX module 128 receives the serialized data stream including the post modulation waveform 250 over the transmission channel 130 and separates the clock data having the side band data from the serialized input data. The deserializer 122 converts the serialized input data to a parallel data stream. The parallel data stream is supplied to the data module 124 via parallel connections 144 for external transmission via input/output 148. The side band data is supplied to the data module 124 from the side band RX module 128.

To illustrate the operation of the receive channel 132, the data module 124 provides a parallel data stream over parallel connections 150. The serializer 120 receives and serializes the parallel data. The side band TX module 126 modulates the serialized data prior to transmission over the receive channel 132.

In this example, the side band RX module 114 receives the modulated serialized data over the receive channel 132. The side band RX module 114 separates the clock and side band data from the serialized data stream. The deserializer 108 receives the serialized data stream and converts it to a parallel data stream on parallel connections 152. The parallel data stream and the side band data are supplied to the data module 110 for external transmission via input/output 156.

Figure 4A:
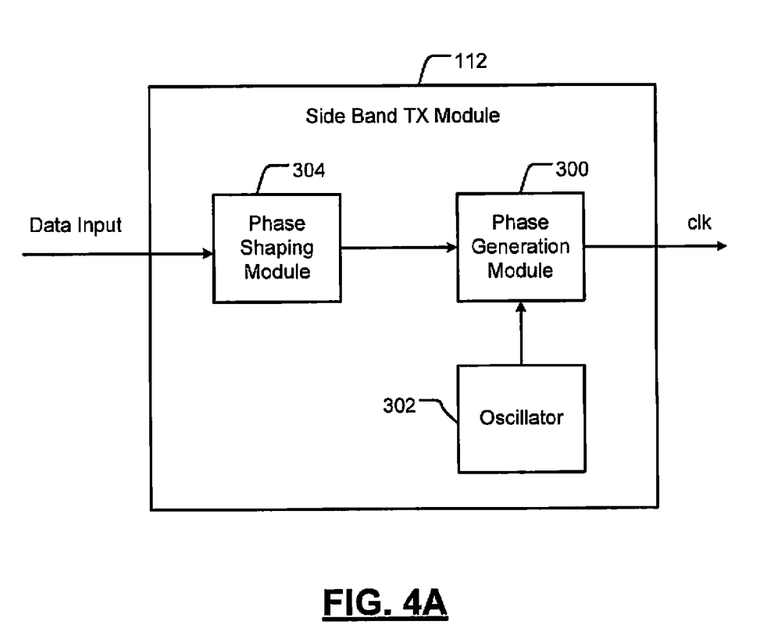
FIG. 4A is a functional block diagram of a side band TX module according to the present disclosure.

Referring to FIG. 4A, the side band TX module 112 is illustrated in more detail. The side band TX module 112 injects clock phase modulation information from a phase generation module 300 into data being serialized by the serializer 106. The data being serialized by the serializer may be clocked according to a local clock signal that is adjusted based on the clock phase modulation information. The local clock signal may be referred to as a TX clock signal. The phase generation module 300 combines a clock signal from an oscillator 302 and phase shaped data from a phase shaping module 304. The phase shaped data from the phase shaping module 304 is based on data input for side band transmission.

Figure 4B:
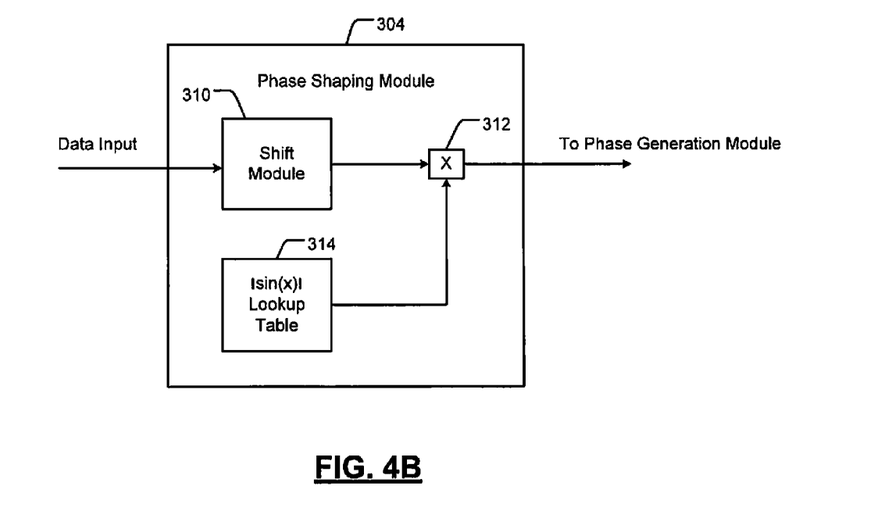
FIG. 4B is a functional block diagram of a phase shaping module according to the present disclosure.

FIG. 4B illustrates one embodiment of the phase shaping module 304 implementing a phase-shift keying (PSK) scheme. The PSK scheme is a digital modulation scheme that uses a finite number of distinct phases to represent each bit of side band data. A shift module 310 cycles through each bit of data, and a combination device 312, such as a multiplier, combines each bit of data with a respective portion of a waveform of the clock signal. For example, a sine lookup table 314 provides the respective portion of the waveform for each data bit. In one embodiment, each data bit is represented by a half cycle of a sinusoidal wave, although a full cycle may be used in alternative embodiments. For example, positive portions of the sinusoidal wave correspond to 1s, and negative portions of the sinusoidal wave correspond to 0s.

Figure 5:
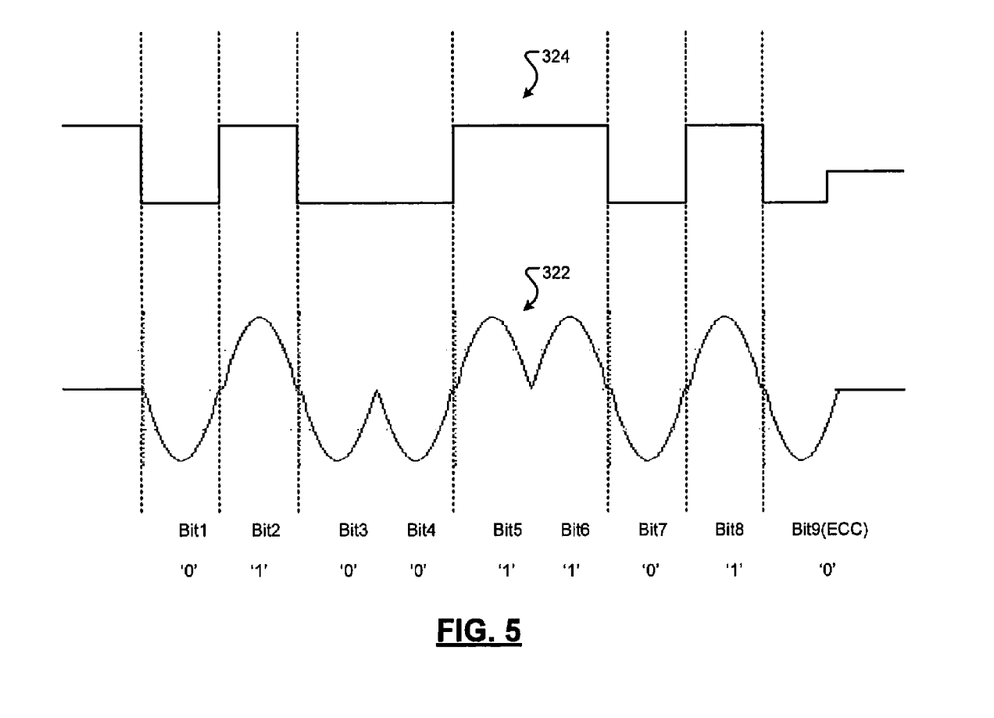
FIG. 5 is a graphical representation that illustrates a sinusoidal waveform based on a square waveform according to the present disclosure.

Referring now to FIG. 5, a bit string, for example 010011010, is input into the shift module 310, and a half cycle of a sinusoidal waveform is applied to each bit. In the example shown in FIG. 5, 8 bits are illustrated along with one error-correcting code (ECC). Each incoming bit is converted to a positive half cycle or negative half cycle of the sinusoid waveform 322 by combining the sine look-up table waveform with the bits from the shift module 310. A square wave representation 324 of the resulting sinusoidal waveform 322 is also illustrated.

The phase generation module 300 outputs a signal that includes the phase vibration of the sinusoidal waveform 322 carried on clock signals. The serializer 106 combines the signal from the phase generation module 300 with the serialized data such that the signal is represented by the edges of a waveform representing the serialized data. This representation is seen by way of example in FIG. 3. In one embodiment, the phase swing of the edges of the serialized data is fine tuned to accommodate channel bit rate and channel signal to noise ratio (SNR).

Figure 6A:
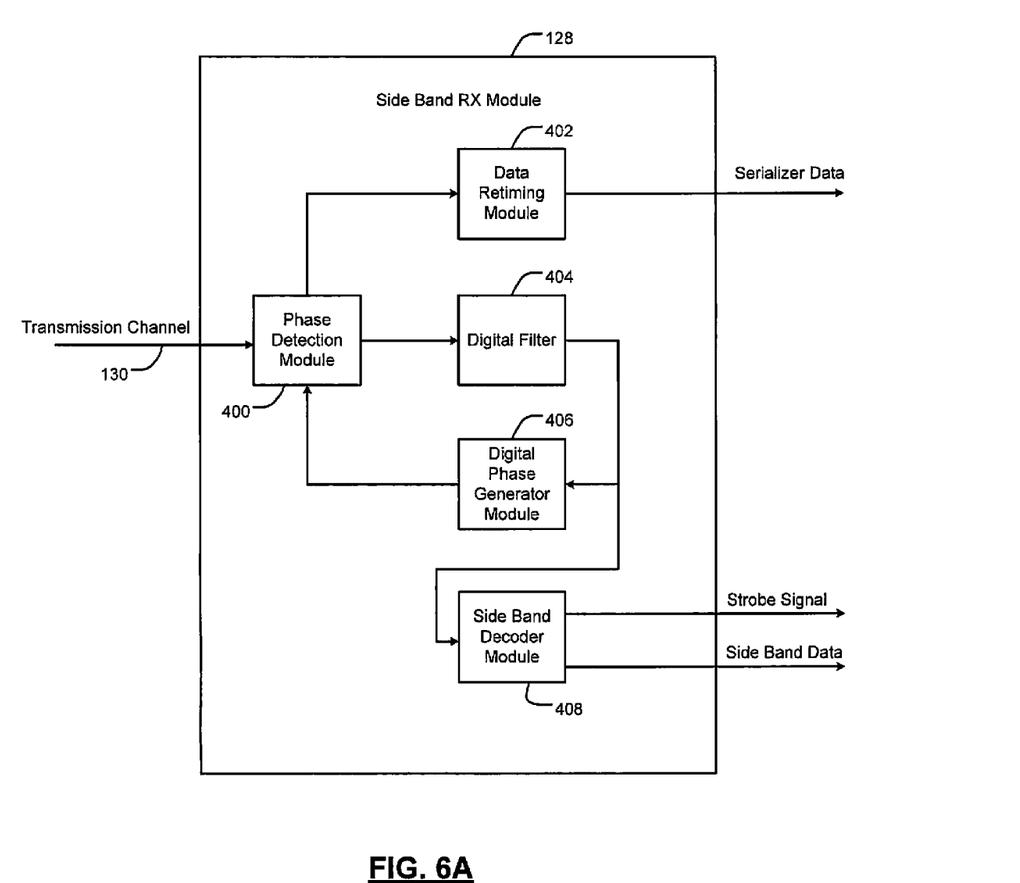
FIG. 6A is a functional block diagram of a side band RX module according to the present disclosure.

FIG. 6A illustrates the side band RX module 128. The side band RX module 128 has a phase detection module 400 for receiving the channel data from the transmission channel 130. An example of a phase detection module 400 is a bang-bang phase detection module that performs a clock and data recovery (CDR).

Further, the phase detection module 400 recovers the modulated clock signal embedded in the serialized data. The side band RX module 128 recovers the modulated clock signal and uses it to retrieve the serialized data. The side band RX module 128 also determines a TX clock signal from the modulated clock signal. In one embodiment, a data retiming module 402 receives and retimes the serialized data based on either the TX clock signal or an RX clock signal and provides the retimed serialized data to the deserializer 122.

A digital filter 404 receives and filters the modulated clock signals including the side band data. A phase generator module 406 receives the filtered clock signal and converts it to a phased clock signal. The phase generator module 406 generates a local clock signal (RX clock signal) running at approximately the same frequency as the TX clock signal. In one embodiment, the TX clock signal corresponds to a local clock signal for the SERDES 102.

The phase generator module 406 produces multiple phases of the modulated clock signal to generate the phased clock signal. The multiple phases are supplied to the phase detection module 400. The phase detection module 400 then acquires the serialized data from the phased clock signal to create phased data signals. The phase detection module 400 determines if the RX clock signal is in phase with the recovered serialized data. If they are in phase, the data retiming module 402 then retimes the serialized data based on either the TX clock signal or the RX clock signal.

In one embodiment, the present disclosure uses CDR to demodulate the injected phase vibration from the side band data. Since the vibration is detected by the CDR as part of the clock signal (i.e. the modulated clock signal), the phase vibration is already compensated by the RX recovered clock signal. The present disclosure can therefore eliminate injected phase vibration and can provide the modulated phase information to the side band decoder module 408.

The side band decoder module 408 also receives outputs of the digital filter 404. Through the phase detection module 400, the digital phase generation module 406 and the digital filter 404, a phase vibration waveform that indicates the modulated phase information is obtained. In one embodiment, the side band decoder module 408 implements an oversampling method to decode the PSK-type modulation from the side band TX module 112.

Figure 6B:
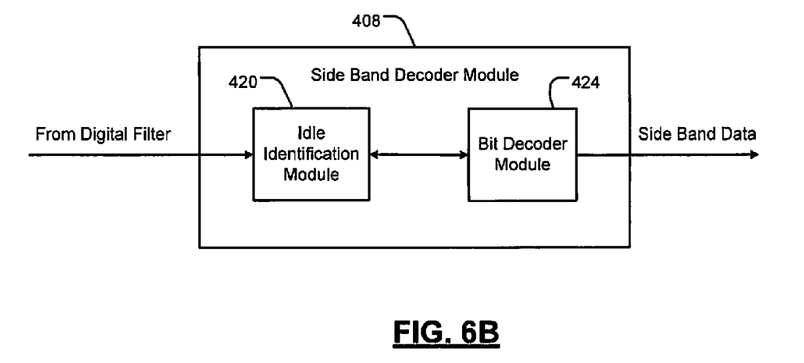
FIG. 6B is a functional block diagram of a side band decoder module according to the present disclosure.

FIG. 6B illustrates an example of the side band decoder module 408. The side band decoder module 408 includes an idle identification module 420 and a bit decoder module 424.

Figure 6C:
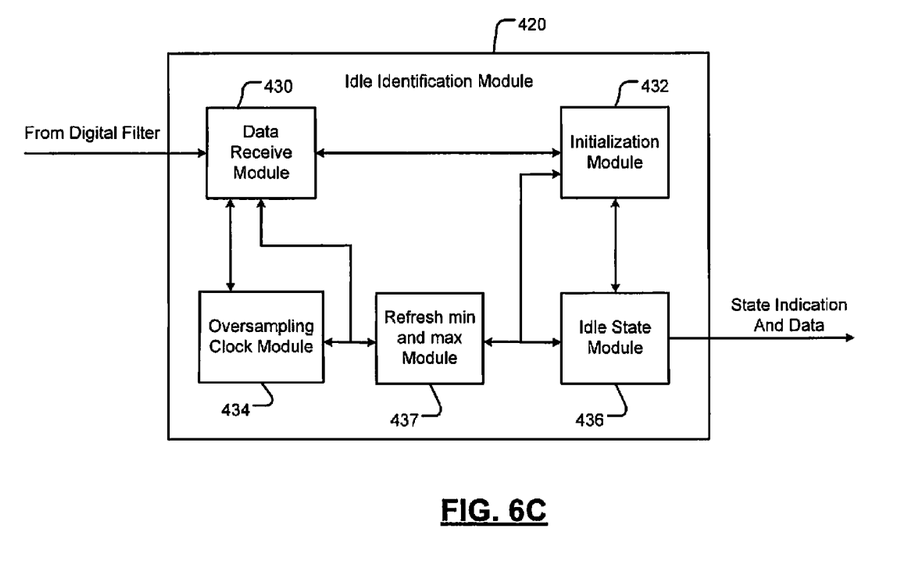
FIG. 6C is a functional block diagram of an idle identification module according to the present disclosure.

Referring to FIG. 6C, the idle identification module 420 is illustrated in further detail. In the idle identification module 420, a data receive module 430 receives data from the digital filter 404. An initialization module 432 initializes the side band decoder module 408.

Figure 7:
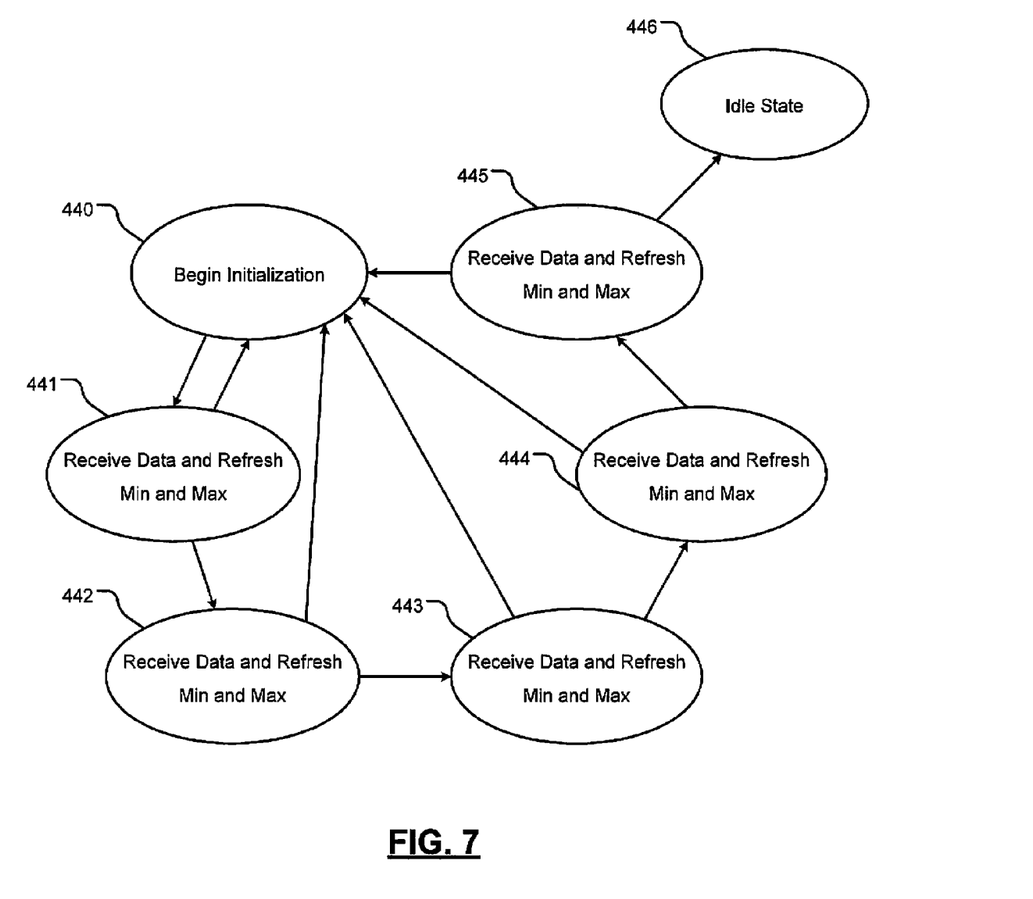
FIG. 7 is a state machine of illustrating initialization of a side band decoder module according to the present disclosure.

FIG. 7 illustrates a state diagram corresponding to an initialization of the side band decoder module 408. In 440, the side band decoder module 408 receives data, and the initialization module 432 begins initialization by sending data to a refresh min and max module 437. In 441, the refresh min and max module 437 sets a minimum value for a lower value among two received and sampled data points. The refresh min and max module 437 sets a maximum value for a higher value among the two sampled data points. For example, if a value of 5 is received for a first sampled data point, and a value of 10 is received for a second sampled data point, the min is set at 5, and the max is set at 10.

If both sampled data points are the same, similar or zero, the state machine either, in one embodiment, indicates that an idle state is occurring, or in another embodiment, continues to 442. Both sampled data points are considered similar or effectively the same when the phase swing between the sampled data points is below a predefined threshold. In the example provided above, the min was set to 5, and the max was set to 10 meaning that the phase swing between the points is 5, and the average of the points is 7.5.

In one embodiment, the idle state module 436 compares the difference between the data points to the predefined threshold. For example, if the predefined threshold is greater than 5, then the sampled points are considered the same or similar. In another embodiment, the idle state module 436 compares the average of the data points to the predefined threshold. For example, if the predefined threshold is greater than 7.5, then the sampled points are considered the same or similar. Otherwise, the sampled points are not considered the same or similar.

In one embodiment, the idle identification module 420 indicates an idle state when the phase swing between the sampled data points is below a threshold. The predefined threshold may be close to zero.

Similar to 441, in 442 the refresh min and max module 437 sets a new minimum value for a lower value among two received and sampled data points that are received following the received and sampled data points of 441. The refresh min and max module 437 sets a new maximum value for the higher value among the two sampled data points. Continuing the example from above, a third data sampled data point has a value of 4, and a fourth sampled data point has a value of 11. Therefore, the new min is 4, and the new max is 11.

If both sampled data points are the same or similar as those found in 441 or zero, the state machine either indicates that an idle state is occurring, in one embodiment, or continues to 442 in another embodiment. 443-445 include similar states as 441-442 where the refresh min and max module 437 sets a respective new minimum value for a lower value among two subsequently received and sampled data points. The refresh min and max module 437 then sets respective new maximum value for a higher value among the two subsequently received and sampled data points.

Likewise if the min and max for 443-445 are the same or similar as those for 441-442 or zero, the state machine indicates that an idle state is occurring. In the present embodiment, all five of 441-445 are performed before the idle state module 436 determines that an idle state is occurring at 446. In other words, each new min and max set for states 441-445 is within the predetermined threshold before an idle state is determined. Alternative embodiments include more or less states for the state machine illustrated in FIG. 7.

An idle state occurs when no data based phase vibration is injected, and thus no modulated phase information corresponding to side band data is obtained. The initialization module 432 performs the initialization to find an idle state. The side band decoder module 408 decodes data following the idle state.

In one embodiment, the CDR of the side band RX module tracks the TX clock signal, and the constant phase shift between the TX and RX clock signals is a random value. Also, in one embodiment, the TX clock and RX clock signals tend to have a minor frequency shift, so phase shift for the idle state may vary within the same TX and RX clock signals. Therefore, one example of the idle state is not zero but a zeroed threshold value. However, side band data is recovered relative to the determined idle state, and thus the idle state is treated as a zero value. The idle identification module 420 therefore handles machine-variation and time-variation of incoming data.

The idle identification module 420 includes an oversampling clock module 434 that samples data at a multiple of the speed of the TX clock signal, such as at a 10× bit rate. An idle state module 436 determines the idle state by detecting a phase index variation range. In other words, sets of incoming phase values are compared in the initialization module 432. If the phase swing is below a predetermined threshold, the idle state occurs, and the idle state module 436 provides an idle state indication.

In the idle state, the idle identification module 420 monitors sample points. When the idle state ends, the bit decoder module 424 starts decoding bits. During decoding, the bit decoder module 424 first determines timing for the bit and then determines the bit.

Figure 6D:
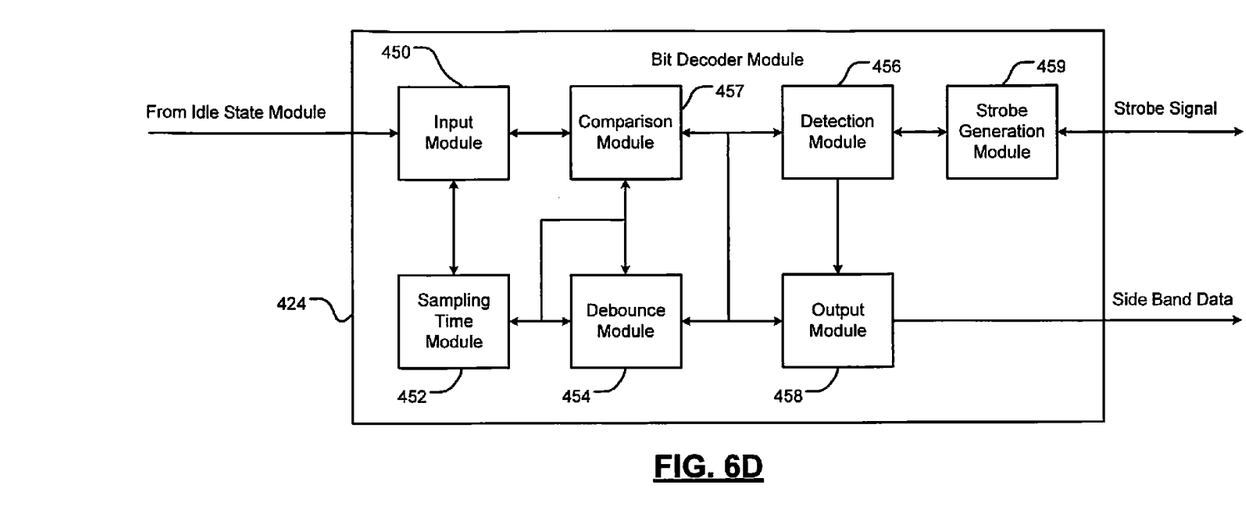
FIG. 6D is a functional block diagram of a bit decoder module according to the present disclosure.

FIG. 6D illustrates the bit decoder module 424 in further detail. The bit decoder module includes an input module 450, a sampling time module 452, a debounce module 454, a detection module 456, a comparison module 457, an output module 458 and a strobe generation module 459.

The input module 450 initiates bit decoding when the idle state module 436 indicates the idle state has ended. Prior to receiving the indication from the idle state module 436, the input module records a first time index and waits for the indication from the idle state module 436. When the indication is received, the input module also records a second time index. The sampling time module 452 averages the above two indexes to determine the first sampling time. The sampling time module 452 determines subsequent sample times by shifting the time index based on the rate of the oversampling clock module 434.

Figure 8:
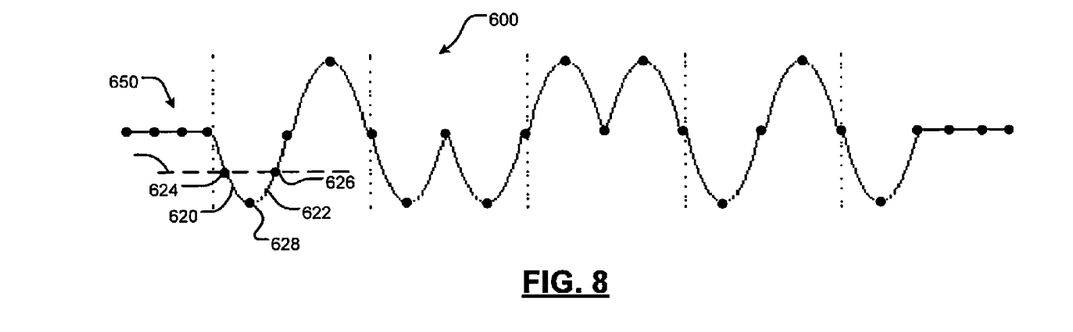
FIG. 8 is a graphical representation that illustrates a sinusoidal waveform based on received side band data according to the present disclosure.

Referring to FIG. 8, a sampled waveform 600 of data received in the side band decoder module 408 is illustrated. The debounce module 454 implements a debounce method for the incoming data in order to avoid errors caused by noise. In one embodiment, a threshold is selected as half of the sinusoid swing. For example, a negative sinusoidal swing 620 and a positive sinusoidal swing 622 are illustrated.

A first sample point 624 is collected on the negative sinusoidal swing 620, a second sample point 626 is collected on the positive sinusoidal swing 622, and a third sample point 628 is collected between the sinusoidal swings 620, 622. The idle state module 436 determines the idle state based on the sample points 650. When the idle state module 436 determines that the idle state has ended, the bit decoder module 424 may conclude that data is being transmitted.

The debounce module 454 then determines that the data is side band data and is not caused by noise. The debounce module 454 checks that phase values of sample points are varying in a predetermined way. In one embodiment, the debounce module 454 sets a temporary base above the base sample points 650. The debounce module 454 then checks that the subsequent sample point(s) increase above the temporary base and then decrease. In another embodiment, the debounce module 454 sets a temporary base below the base sample points 650. The debounce module 454 then checks that the subsequent sample point(s) decrease below the temporary base and then increase.

For example, the debounce module 454 checks that a second sample point 628 is below a first sample point 624 and that a third sample point 626 is above the second sample point 628. The debounce module 454 then indicates that the sample points are caused by data and not noise.

In one embodiment, the bit decoder module 424 decodes bits after the sampling time is determined. The comparison module 457 determines the respective bit by comparing an incoming value with the idle base sample points 650.

In another embodiment, the comparison module 457 averages the incoming data in the bit interval. In other words, the comparison module averages a value of sample point 624, sample point 628, and/or sample point 626. The comparison module 457 then compares the average with the idle base at the sampling points 650.

In either of the above embodiments, an ECC bit can be inserted in the bit series as side band data to enhance reliability. For example, the byte group based on the waveform 600, which is in turn a representation of the sent data waveform 322 in FIG. 5, includes 8 bits of data and 1 ECC bit.

Figure 9:
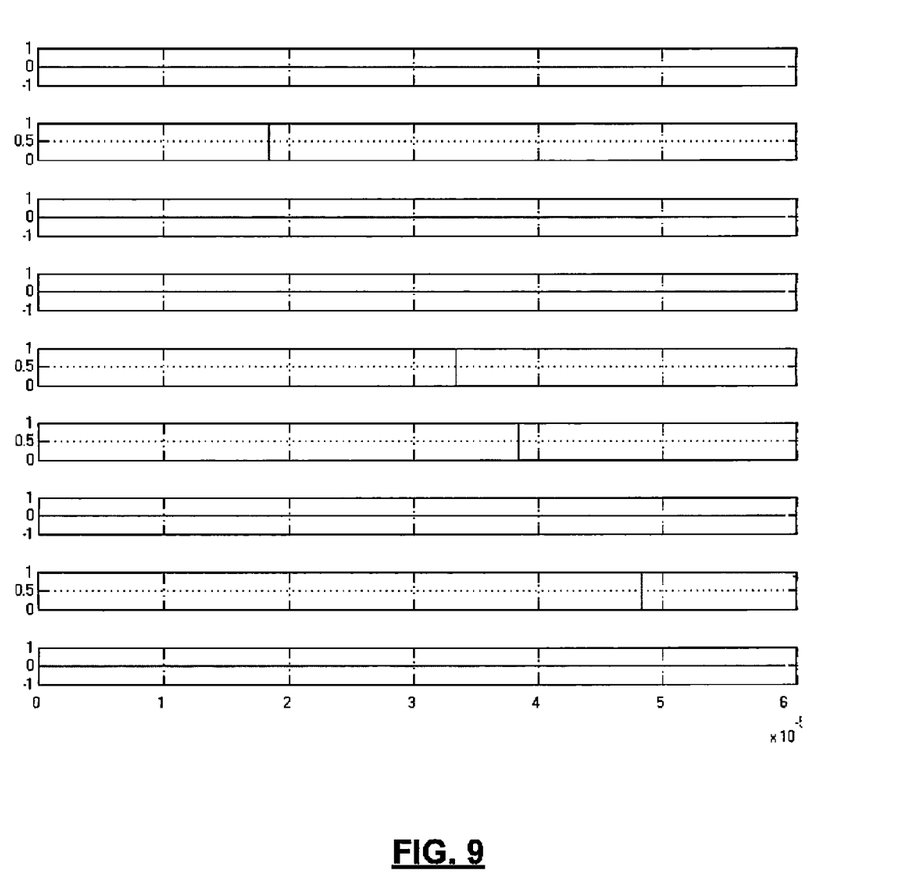
FIG. 9 is a graphical representation that illustrates a demodulated bits according to the present disclosure.

FIG. 9 illustrates an example of the demodulated bits from the side band decoder module 408. From the top down in FIG. 9, the decoded bit stream is 010011010, which corresponds to an example of the originally encoded side band data. In one embodiment, the strobe generation module 459 asserts the strobe signal when all the bits are ready, i.e. all the bits are decoded and the data transfer is complete. In another embodiment, the decoded bit stream is output bit by bit from the side band decoder module 408.

Figure 10:
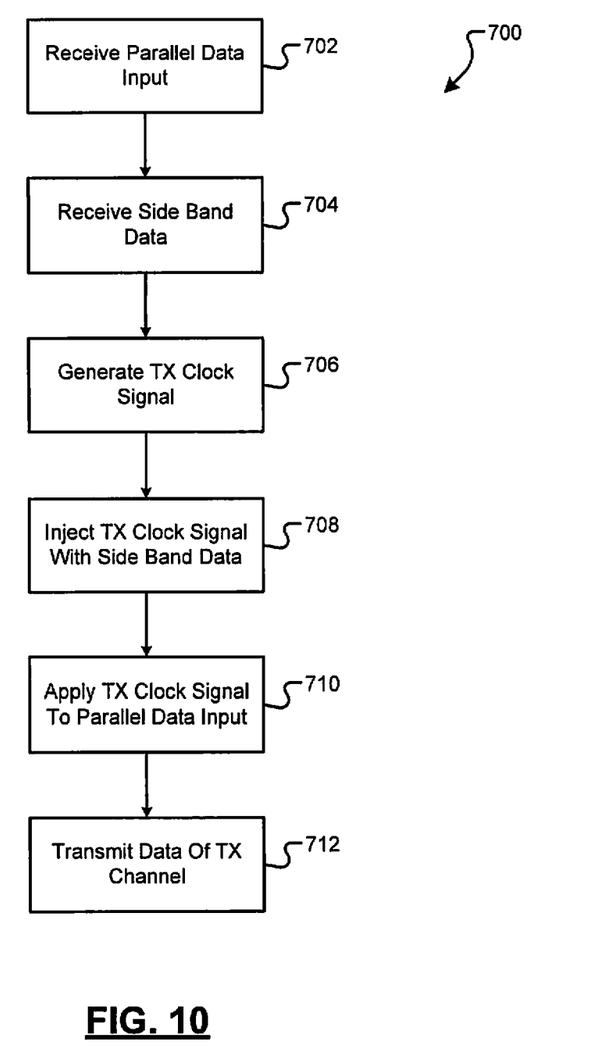
FIG. 10 is a block diagram that illustrates a method for transmitting data according to the present disclosure.

Referring now to FIG. 10, an example of a method 700 for transmitting side band data over a data transmission system 100 is illustrated. At 702 the system 100 receives parallel data input from the data module 110 into the serializer 106. The serializer 106 serializes the parallel data input. At 704 the side band TX module 112 receives side band data. At 706 the side band TX module 112 generates a clock signal.

At 708 the side band TX module 112 injects the clock signal with the side band data to generate a modulated clock signal. At 710 the side band TX module 112 applies the modulated clock signal to the serialized data by adjusting phases of leading and/or trailing edges of the serialized data. At 712 the serializer 106 transmits the data of the transmission channel including both the serialized data and side band data.

Figure 11:
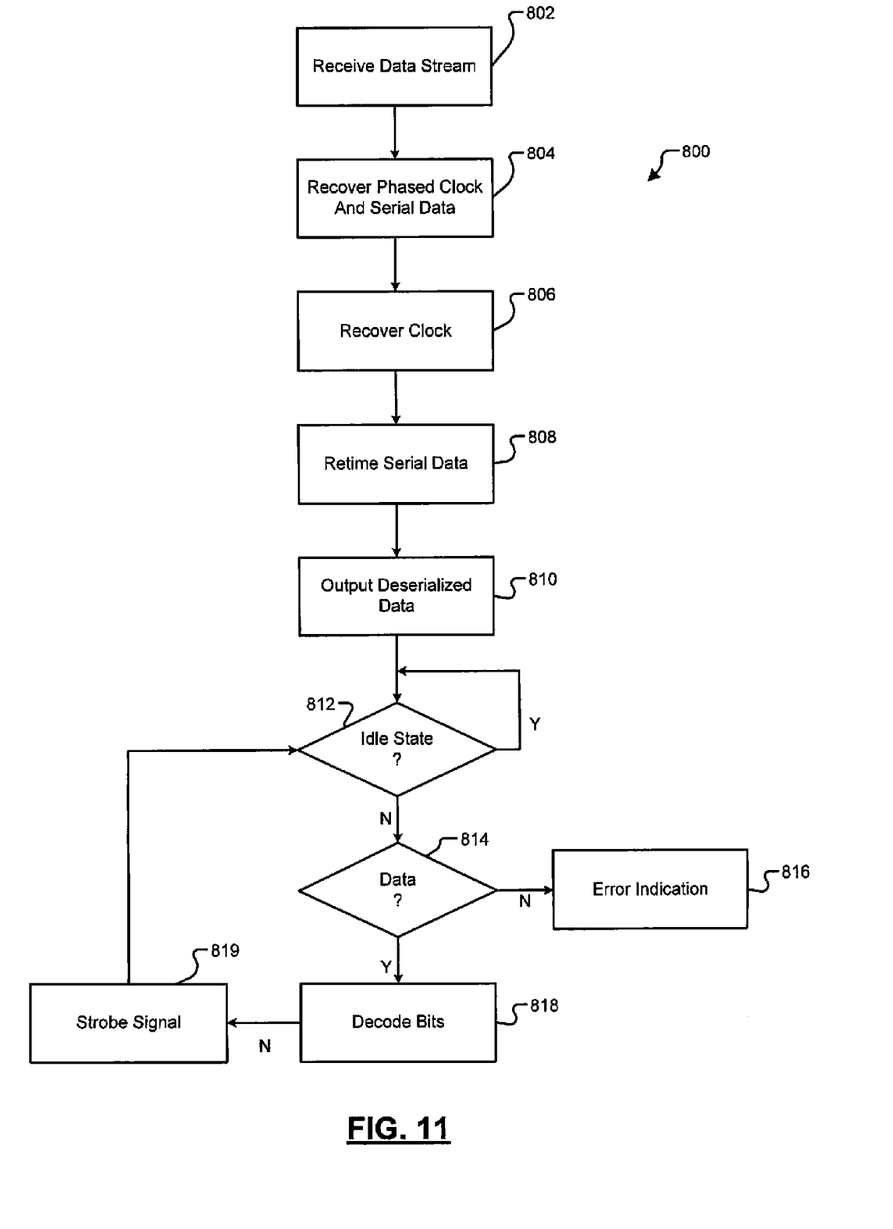
FIG. 11 is a block diagram that illustrates a method for receiving data according to the present disclosure.

FIG. 11 illustrates a method 800 for receiving side band data through a data transmission system 100. At 802 the side band RX module 128 receives the data stream including the serialized data and the side band data from the SERDES 102. At 804 the side band receive module recovers a phased clock signal and serialized data. At 806, the side band RX module 128 recovers the clock signal from the phased clock signal.

At 808 the side band RX module 128 retimes the serialized data that was recovered from the received data stream. At 810 the deserializer 122 deserializes the serialized data. At 812 the side band RX module 128 determines whether an idle state is present. If the side band RX module 128 determines that an idle state is present, 812 cycles until the idle state concludes and data is being received, at 814. At 814, the side band RX module 128 determines whether the data simply represents error or represents side band data.

For a negative response, at 816, an error indication is output. For a positive response, at 818, the side band RX module 128 decodes bits. After bits are decoded at 818, control returns to 812 to determine whether or not an idle state is present and/or the strobe generation module 459 asserts a strobe signal at 819. If present, data decoding ceases until the idle state ends.

The broad teachings of the disclosure can be implemented in a variety of forms. For example, one or more methods steps described above can be performed in a different order (or concurrently) and still achieve desirable results. Therefore, while this disclosure includes particular examples, the true scope of the disclosure should not be so limited since other modifications will become apparent upon a study of the drawings, the specification, and the following claims.

What is claimed is:

1. A system, comprising:
a side band transmission module configured to combine side band data with a clock signal to generate a modified clock signal; and
a serializer configured to provide an initial waveform corresponding to serialized input data,
wherein, to modulate the serialized input data, the modified clock signal adjusts at least one of a leading edge or a falling edge of N half cycles of the initial waveform based on the side band data to form a modified waveform, the modified waveform having pulses with at least one of an increased pulsed width and a decreased pulse width with respect to the initial waveform,
wherein the serializer is configured to output the modified waveform, and wherein N is greater than or equal to 1,
wherein the side band transmission module comprises a phase shaping module configured to generate a phase signal representation of the side band data, and
wherein the phase shaping module comprises:
a shift module configured to cycle through data bits of the side band data;
a lookup-table configured to provide sinusoidal waveforms for each of the data bits of the side band data; and
a combination module configured to combine the data bits of the side band data with the sinusoidal waveforms.

2. The system of claim 1, wherein the side band transmission module comprises a phase generation module configured to generate the modified clock signal based on (i) the clock signal and (ii) the phase signal representation of the side band data.

3. The system of claim 2, wherein the side band transmission module comprises an oscillator configured to generate the clock signal.

4. The system of claim 1, wherein the modified clock signal adjusts both leading edges and falling edges of each of L half cycles of the initial waveform based on the side band data to allow transmission of L-M bits of side band data,
wherein M is greater than or equal to 1, and
wherein L is greater than 1.

5. The system of claim 4, wherein M corresponds to a number of bits of error-correction code (ECC).

6. The system of claim 1, further comprising:
a first serializer/deserializer (SERDES) comprising the side band transmission module and the serializer; and
a second SERDES comprising
a side band receive module configured to (i) receive the modified waveform, (ii) recover each of the serialized input data and the modified clock signal, and (iii) decode the side band data from the modified clock signal, and
a deserializer configured to deserialize the serialized input data.

7. A system, comprising:
a side band receive module configured to (i) receive a first waveform, (ii) recover each of serialized data and a modified clock signal from the first waveform, (iii) sample the modified clock signal, and (iv) decode and output side band data from the modified clock signal after the modified clock signal is sampled, wherein the modified clock signal includes side band data encoded in at least one of a leading edge or a falling edge of N half cycles of a second waveform corresponding to the serialized data, wherein the second waveform includes pulses with at least one of an increased pulsed width and a decreased pulse width with respect to the first waveform, and wherein N is an integer greater than or equal to 1; and
a deserializer configured to deserialize and output the serialized data,
wherein the side band receive module comprises an idle identification module configured to determine whether the side band data is present in the modified clock signal by establishing a first base idle state based on first sample points on the modified clock signal.

8. The system of claim 7, wherein:
the side band receive module further comprises a bit decoder module configured to decode and output the side band data from the modified clock signal; and
a side band decoder module is configured to decode the side band data in response to signals from the idle identification module indicating that the first base idle state has ended.

9. The system of claim 8, wherein the side band decoder module is configured to decode the side band data from the modified clock signal by determining that second sample points differ from the first sample points.

10. The system of claim 9, wherein the side band decoder module is configured to determine that the second sample points differ from the first sample points by (i) generating an average of the second sample points and (ii) comparing a value of the average to a value of the first sample points, wherein the second sample points correspond to points along a half cycle of a third waveform representing the modified clock signal.

11. The system of claim 8, wherein the side band decoder module is configured to terminate the decoding of the side band data based on signals from the idle identification module indicating that a second base idle state has been reached for the modified clock signal based on second sample points.

12. The system of claim 11, wherein the first sample points include at least two sample points that are at least substantially similar with respect to an amplitude of the modified clock signal.

13. A method, comprising:
receiving a first waveform;
recovering each of serialized data and a modified clock signal from the first waveform;
sampling the modified clock signal;
decoding side band data from the modified clock signal after the modified clock signal is sampled;
outputting the side band data from the modified clock signal after the modified clock signal is sampled, and wherein the modified clock signal includes side band data encoded in at least one of a leading edge or a falling edge of N half cycles of a second waveform corresponding to the serialized data, wherein N is an integer greater than or equal to 1;
determining by an idle identification module whether the side band data is present in the modified clock signal by establishing a first base idle state based on first sample points on the modified clock signal;
deserializing the serialized data; and
outputting the serialized data.

* * * * *